July 8, 1930.  W. A. ALLISON  1,769,981
HAND TRUCK
Filed May 21, 1929
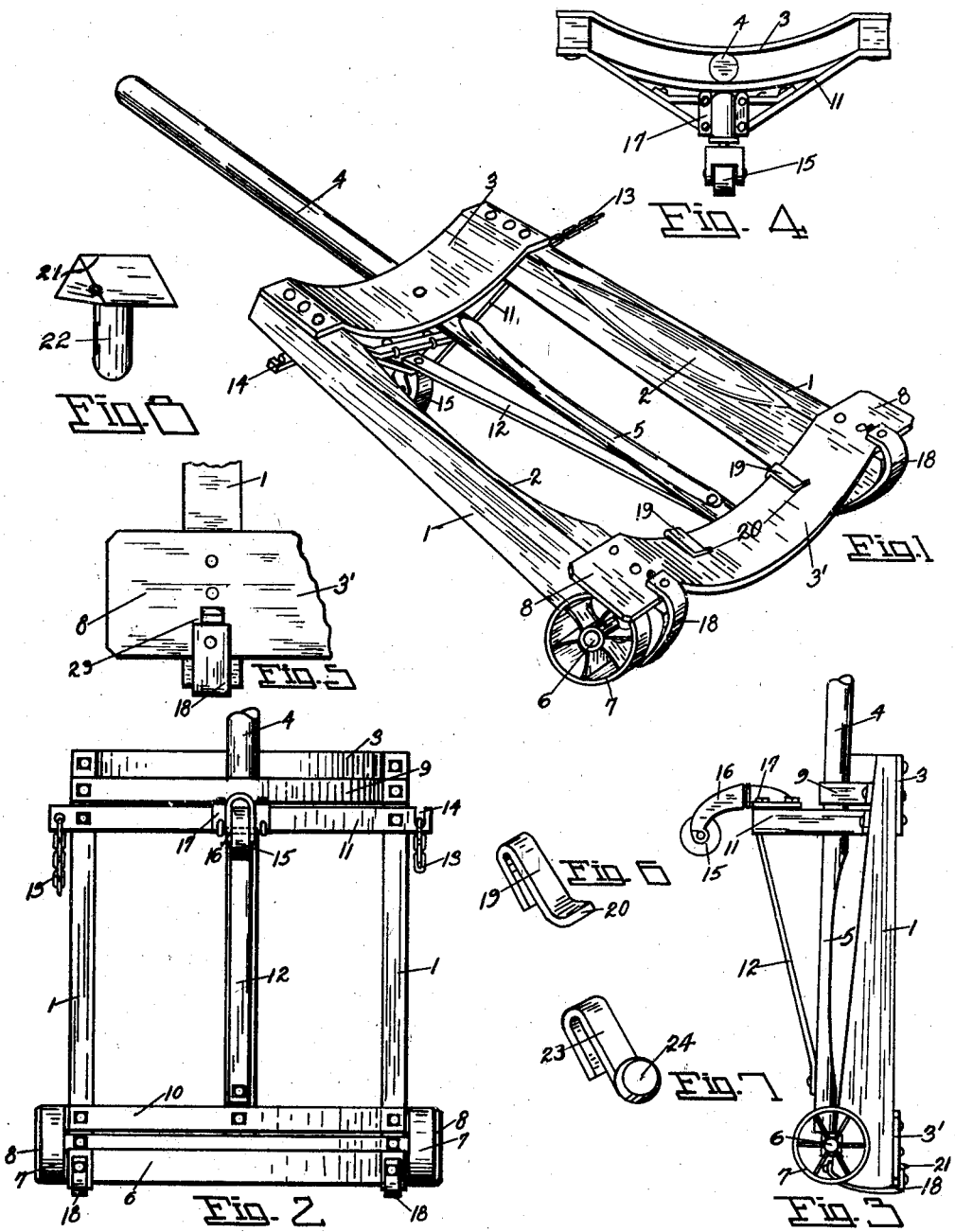
William A. Allison *Inventor*
By *Herbert E. Smith,*
Attorney Patented July 8, 1930

1,769,981

UNITED STATES PATENT OFFICE

WILLIAM A. ALLISON, OF SPOKANE, WASHINGTON

HAND TRUCK

Application filed May 21, 1929. Serial No. 364,791.

My present invention relates to improvements in hand trucks of the one-man type, which, while adapted for handling various loads, is especially designed for handling barrels, kegs, drums, and other compact and comparatively heavy loads. The truck of my invention is of that type that may be trundled or wheeled similar to the manipulation of a wheel barrow, but it is supported at three points in order that the entire load may be carried on three spaced wheels, and the loaded truck easily steered.

The primary object of the invention is to improve the construction of trucks of this type for the purpose of insuring a light, but strong and well braced and evenly balanced implement which may be freely manipulated for engaging, lifting, and carrying heavy loads as barrels or kegs of nails and various other commodities about hardware stores, buildings under construction, and at other places.

My invention consists in certain novel combinations and arrangements of parts as will hereinafter be more fully set forth and claimed. In the accompanying drawings I have illustrated one complete example of the physical embodiment of my invention in which the parts are combined and arranged according to the best mode I have thus far devised for the practical application of the principles of my invention.

Figure 1 is a perspective view of a truck embodying my invention. Figure 2 is a bottom plan view of the truck. Figure 3 is a side view of the truck in position to pick up a load. Figure 4 is a detail view at the rear or handle end of the truck showing the swiveled steering wheel arrangement. Figure 5 is an enlarged detail of one of the rockers for supporting the truck when in loading position. Figure 6 is a perspective view of one of a pair of retaining devices for the load located near the front of the truck. Figure 7 is a detail of a slightly modified form of retaining device that may be substituted for the device of Figure 6. Figure 8 is a perspective view of a triangular lug, used to assist in raising and holding boxes, etc.

In carrying out my invention I provide a rigid, somewhat rectangular carrier or supporting frame for the load, as a barrel or keg, which frame or carrier comprises a pair of wooden side bars 1, 1, cut away as at 2 along their upper, inner edges, to conform to the shape of a barrel that is to be supported in the carrier. These side bars are joined by a rear cross plate 3 and a front cross plate 3', both of which are concaved to receive a barrel or keg and are securely riveted or bolted near their ends to the side bars 1, 1, of the carrier.

The truck may be manipulated by one man, through the instrumentality of a central longitudinally disposed handle 4, that is cut away at 5 at its upper face to conform to the concave cross plates and the cut-away side bars, for the reception of a barrel or keg. The handle is rigidly attached at the front and rear ends of the carrier or frame and may be used in up-ending the truck, as well as for pushing, pulling and steering the truck.

At the front end of the carrier a transversely disposed axle 6 has journaled thereon a pair of wheels 7, and as seen in Figure 1 the front cross plate 3' has its opposite ends 8, 8 guarding these wheels against contact from a load.

At its underside the carrier is provided with an upper cross bar 9 and a lower cross bar 10 that rigidly join the handle bar with the carrier and brace the latter at its underside.

At the rear underside of the carrier an arch bar or drop bar 11 extends transversely from side to side and is bolted to the side bars, and a tie bar 12, which extends longitudinally of the carrier, is bolted at its forward end to the tongue or handle and at its rear end to the arch bar 11 for bracing the latter and reinforcing the carrier.

When a barrel is to be carried as the load, the barrel may be secured in position by means of a cross chain 13 which is anchored at one side of the carrier to an end of the arch bar, and the other end of this bar is fashioned with a hook 14 to which the free end of the chain is to be attached by means of a selected link.

The arch bar is utilized as a support for the swiveled caster wheel 15 by means of which the loaded truck is steered, and which wheel supports the rear part of the truck, forming with the two wheels 7, 7, three spaced points of support for the loaded truck. The steering wheel is journaled in a yoke 16, and the latter is swiveled in a ball-bearing housing 17 that is carried on the arch bar.

Adjacent each of the front wheels 7, and supported at the ends of the side bars, are two rockers 18 that curve under, from the tops of the side bars where they project beyond the wheels, back of the wheels, as best seen in Figure 3. These rockers are secured to the side bars and they are positiond so that the weight and load of the truck may be transferred from the wheels to the rockers, and vice versa, as the truck is up-ended (Figure 3), or as the truck is turned down from the position of Figure 3 to that of Figure 1.

The truck is manipulated by the use of the handle 4, and when up-ended as in Figure 3, holders 19 and their hooks 20 are utilized for engaging the lower edge of the keg, or the hoops of a barrel, to assist in holding the load when it is first engaged, and for retaining the crate, keg, or barrel against displacement after the carrier is turned to the position of Figure 1. These holders are U-shaped straps of resilient metal that are slipped over the upper or rear edge of the front cross plate 3′ and they are retained in adjusted position by frictional engagement with the plate. The hooks 20 may thus be located in desired position in front of the plate to engage various sizes of loads.

A pair of fixed carrier lugs (as best seen in Figure 8) are also employed for frictionally engaging a box, crate, barrel, or other load, as it is being shifted onto the truck, and for holding the load after it is placed on the truck. These lugs, which are wedge-shaped and are provided with a "biting" edge for engaging the load, have integral attaching bosses 22 by means of which they are solidly anchored or attached to the plate 3′, directly above the rockers 18, in position to engage the load.

The holders or the carrier lugs, or both holders and lugs, together with the chain 13 that is wrapped across the front of the load and secured to the hook 14, hold the load while it is being transported by the carrier or truck, on its three wheels.

In Figure 7 a modified form of the holder is illustrated as 23, and this type of holder has a knob 24 for engaging the load.

Having thus fully described my invention, what I claim as new and desire to secure by Letters Patent is:—

1. The combination with a carrier frame, of a front axle and a pair of spaced wheels journaled thereon, a rear arch frame and a steering wheel swiveled therein, a longitudinally disposed handle secured in the frame, said carrier frame including a front cross plate having its ends extended over the wheels to form guards, and a resilient U-shaped, adjustable, load-holder carried by the front cross plate.

2. The combination with a carrier frame, of a front axle and a pair of spaced wheels journaled thereon, a rear swiveled wheel, said carrier frame comprising side bars and a front cross plate, rockers secured at the front ends of the side bars and projecting beyond the front wheels, carrier lugs secured to the cross plate adjacent said rockers, and a longitudinally extending handle secured to the frame.

3. In a hand truck, the combination with a pair of side bars, a pair of concave cross plates secured thereto, and a pair of rockers at the front ends of the side bars, of a pair of spaced wheels adjacent the rockers, a longitudinally extending handle, an arch frame at the rear of the truck, a steering wheel swiveled in the arch frame, and the ends of the front cross plate extending beyond the wheels for the purpose described.

In testimony whereof I affix my signature.

WILLIAM A. ALLISON.